United States Patent [19]

Noda et al.

[11] 4,101,449

[45] Jul. 18, 1978

[54] CATALYST AND ITS METHOD OF PREPARATION

[75] Inventors: Mikio Noda, Nagoya; Yoshinobu Yamaguchi, Seto; Ken-ichiro Uwano, Kariya; Nobuhiro Sato, Nagoya; Tadayoshi Tomita; Koji Otsuka, both of Yokohama, all of Japan

[73] Assignees: Fujimi Kenmazai Kogyo Co., Ltd., Aichi; Toyo Engineering Corporation, Tokyo, both of Japan

[21] Appl. No.: 795,417

[22] Filed: May 9, 1977

[30] Foreign Application Priority Data

Jul. 20, 1976 [JP] Japan ............................ 51-86272

[51] Int. Cl.$^2$ .................... B01J 21/04; B01J 21/08; B01J 23/78
[52] U.S. Cl. ................ 252/457; 252/466 J; 48/214 A; 423/654
[58] Field of Search .................. 252/457, 466 J; 48/214 A; 423/653, 654

[56] References Cited

U.S. PATENT DOCUMENTS

| | | | |
|---|---|---|---|
| 3,001,952 | 9/1961 | Reitmeier et al. | 48/214 A |
| 3,186,797 | 6/1965 | Pearce et al. | 252/466 J |
| 3,391,089 | 7/1968 | Mayland et al. | 252/466 J |
| 3,759,678 | 9/1973 | Chamberland et al. | 25/466 J |

*Primary Examiner*—W. J. Shine
*Attorney, Agent, or Firm*—Blanchard, Flynn, Thiel, Boutell & Tanis

[57] ABSTRACT

A catalyst comprising 10 to 30 wt.% of nickel as nickel oxide, 20 to 60 wt.% of calcium as calcium oxide, 10 to 70 wt.% of aluminum as aluminum oxide and containing less than 1 wt.% of silicon dioxide. The catalyst is prepared by using: as the starting material for the nickel component, fine particles of nickel oxide obtained by heating a nickel compound which is decomposed to nickel oxide by heating at a temperature in the range of 400° to 800° C in the presence of oxygen; as the starting material for the calcium component, calcium oxide per se or a calcium compound which is decomposed to calcium oxide by heating and; as the starting material for the aluminum component, alumina cement of a high purity. The catalyst is prepared by mixing and kneading the starting materials with water, molding the same, then keeping the catalyst composition under a highly humid atmosphere at a temperature in the range of 5° to 35° C for longer than one day for hydrating and hardening the cement and thereafter sintering the same at a temperature in the range of 550° to 1200° C.

9 Claims, 3 Drawing Figures

CATALYST AND ITS METHOD OF PREPARATION

BACKGROUND OF THE INVENTION

1. Field of the Invention

This invention relates to a catalyst useful for the production of a gaseous mixture containing hydrogen as a principal ingredient, by the steam reforming of hydrocarbons.

The catalyst of the present invention makes it possible to use, in the steam reforming process, heavier hydrocarbons such as kerosene and gas oil which cannot be used in the presence of a conventional catalyst. Such heavier hydrocarbons can be steam-reformed into hydrogen-rich gaseous mixtures stably and continuously for a long period of time. In addition the catalyst of the invention is also useful with light hydrocarbon feedstocks such as natural gas, ethane, propane, butane and straight-run naphtha.

2. Description of the Prior Art

Nickel catalysts have been used widely as steam reforming catalysts. However, it has been well known that the nickel catalysts are deactivated rapidly by sulfur contained in the feed hydrocarbons and, therefore, pretreatment of the feedstock hydrocarbons for removing a major portion of sulfur therefrom is critical. Usually, the allowable sulfur impurity content is limited to a low level, such as 0.2 ppm.

Further, depending on the kind of feedstock hydrocarbons and/or reaction conditions, thermal cracking of the hydrocarbons may proceed excessively due to the high activity of nickel and the carbon thus formed is deposited on the catalyst surface to block the catalyst from the reactants, thereby inhibiting the steam reforming reaction. As a result, an inactive catalyst is present in the reaction zone so that only the thermal cracking of the hydrocarbons proceeds whereby carbon accumulates rapidly in the reaction zone. Thus, the space in the reaction zone becomes filled with carbon in a short period of time.

Thus, in the prior art, a highly effective desulfurization treatment of the feedstock hydrocarbons is necessary. Also, the deposition of carbon on the catalyst surface is a fatal barrier to a continuous catalytic gasification process.

Accordingly, for preventing deposition of carbon formed by the reaction on the surface of the nickel catalyst, reduction of the high activity of nickel has been considered and incorporation of a compound of a metal such as potassium in the catalyst composition has been effected in practice. However, such a means is ineffective for heavy hydrocarbon feedstocks, although it may be effective for light hydrocarbon feedstocks.

The improvement caused by the addition of potassium or the like to the nickel catalyst, however, involves some problems such as an excessive reduction of the intrinsic activity of nickel, deterioration of the catalyst due to vaporization of the additives and adherence of the evaporated substances to lower temperature parts of the apparatus.

A process for preparing nickel-free catalysts effective for steam reforming, catalytic partial oxidation and catalytic thermal cracking is described in U.S. Pat. No. 3,969,542.

The catalysts disclosed in U.S. Pat. No. 3,969,542 are nickel-free, firm, sintered products obtained from alkaline earth metal oxides and aluminum oxide by a specified method. They have a remarkable sulfur resistance and a carbon deposition-preventing property and, further, they are free from the problem caused by vaporization of catalyst ingredients.

For further improving the catalysts of U.S. Pat. No. 3,969,542 to increase the activity thereof, the inventors investigated catalyst additives, repeatedly made experiments by using various additives and determined the results thereof.

SUMMARY OF THE INVENTION

The inventors have discovered that if fine particles of nickel oxide prepared by a specified method are incorporated in an amount in a predetermined range in a catalyst system of U.S. Pat. No. 3,969,542, the desired high activity is achieved and, in addition, the high activity of the catalyst lasts for a long period of time even if a large amount of sulfur impurities is contained in the feedstock hydrocarbons.

The high activity makes it possible to achieve good results such as a reduction in the temperature of the steam reforming reaction zone or an increase in the capacity of the reaction vessel. The long-lasting, high activity of the catalyst makes it possible to use inexpensive, impure feedstock hydrocarbons of low quality.

The catalyst of the present invention comprises 10 to 30 wt.% of nickel as nickel oxide, 20 to 60 wt.% of calcium as calcium oxide, 10 to 70 wt.% of aluminum as aluminum oxide and, critically, less than 1 wt.%, preferably less than 0.5 wt.%, of silicon dioxide contained therein as an impurity. The catalyst is prepared by using: as the starting material for the nickel component, fine particles of nickel oxide obtained by heating a nickel compound which is decomposed to pure nickel oxide free from impurities by heating at a temperature in the range of 400° to 800° C in the presence of oxygen; as the starting material for the calcium component, calcium oxide per se or a powdery calcium compound which is decomposed to pure calcium oxide free from impurities by heating; and, as the starting material for the aluminum component, alumina cement of a high purity. The catalyst is prepared by mixing and kneading the starting materials with water, molding the same to form catalyst objects, then keeping the catalyst objects under a highly humid atmosphere at a temperature in the range of 5° to 35° C, preferably 10° to 25° C, for longer than one day, for hydrating and hardening the cement component of the catalyst objects and thereafter sintering the catalyst objects at a temperature in the range of 550° to 1200° C.

The active ingredients of the catalyst are calcium oxide and nickel oxide. The catalyst contains aluminum oxide as a refractory binder for binding the two active ingredients firmly.

The effective amount of the nickel oxide component contained in the catalyst is from 10 to 30 wt.%. When the nickel oxide content is in this range, the catalyst has a high activity. When this catalyst is used, the methane content of the gaseous mixture obtained by steam reforming of hydrocarbons is kept at a low level. Consequently, the temperature required for the steam reforming reaction can also be lowered.

BRIEF DESCRIPTION OF THE DRAWINGS

FIG. 1 shows the change of the amount of methane in the product gas obtained by a steam reforming reaction when the nickel content of the catalyst is varied from 5 wt.% to 30 wt.%, while the calcium oxide content of the catalyst is kept constant (40%).

Figure 1:
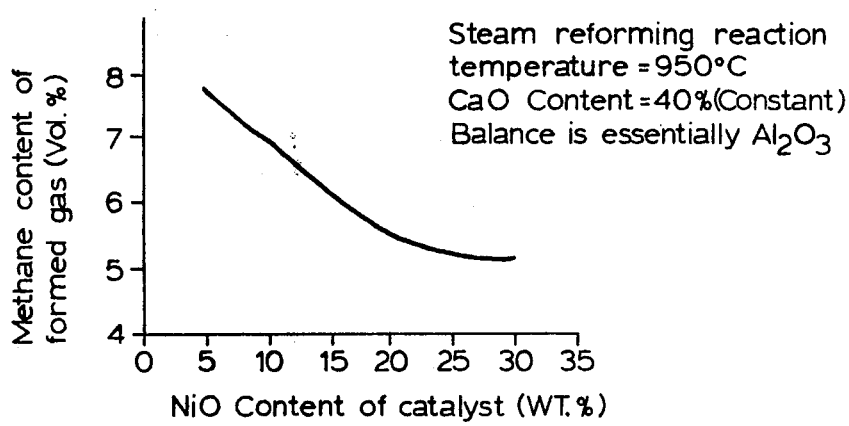
FIG. 1 is a graph showing the relation of methane content of the product gas to the NiO content of the catalyst.

The experimental conditions of this steam reforming reaction were as follows: the feedback was a gas oil comprising 85.9 wt.% of carbon, 13.64 wt.% of hydrogen and 0.41 wt.% of sulfur, the reaction temperature was 950° C, the steam/carbon molar ratio was 2.99 and the residence time in the reaction zone was 0.06 second.

If the amount of nickel, calculated as nickel oxide, in the catalyst composition is less than 17 wt.%, the amounts of other residual hydrocarbons, in addition to methane, are also increased in the product gas.

The starting material, used for incorporating nickel oxide in the catalyst, is specially prepared separately, prior to mixing same with the starting materials for the other catalyst components. For this purpose there are used fine particles of nickel oxide obtained by heating a pure nickel nickel oxide-forming nickel compound at a temperature of 400° to 800° C in the presence of oxygen to change it physically and chemically, thereby subdividing it into fine particles by the cracking action during dehydration, thermal decomposition and oxidation.

Though many nickel compounds are suitable for use as the starting compounds for conversion into nickel oxide even at a heating temperature of below 400° C, the conversion thereof into nickel oxide is insufficient at a temperature below 400° C and bonds contained in the starting materials still remain to some extent whereby the obtained nickel oxide is of impure quality and, in addition, elements other than nickel contained in the starting compounds also remain in the oxide product.

On the other hand, when the nickel compound is heated at a temperature of about 800° C, the fine particles of nickel oxide agglomerate gradually whereby the original desired condition thereof, namely, independent, separate, small particles, is lost. Thus, the strict selection of the starting material as the nickel oxide precursor to be thermally cracked, becomes meaningless when such a high temperature is employed.

A reason why thermal cracking is effected in the presence of oxygen is that, if the starting nickel compound, particularly an organic nickel compound, is heated in the absence of oxygen under a reducing atmosphere, metallic nickel is formed and crystals of metallic nickel grow into lumps and, further, the carbon contained in the organic nickel compound remains and it adheres to the sintered nickel lumps and coats them. The heating is thus effected in the presence of oxygen for prevention of the above phenomena.

For preventing the formation of carbon, which is relatively stable even at a high temperature when it is in the form adhered to fine particles of nickel, it is preferred to contact the starting nickel compound with an oxygen-containing gas, such as air, from the start of the heating.

The fine particles of nickel oxide thus carefully prepared have a melting point of about 1990° C. The respective fine particles have a particle diameter of usually less than 1 micron, mostly less than 0.5 micron.

The fine particles of nickel oxide employed in the catalyst of the present invention have a particle diameter of less than 10 microns. As starting materials for preparing the fine particles of nickel oxide, there can be used any nickel compound which is thermally decomposed in the presence of oxygen into pure nickel oxide free from impurities such as inorganic nickel compounds, for example, nickel hydroxide, nickel nitrate, nickel carbonate and nickel sulfide, or organic nickel compounds, for example, nickel formate, nickel acetate and nickel oxalate.

Calcium oxide, i.e. one of the most important ingredients of the catalyst, accelerates the steam reforming reaction and particularly it has a remarkable effect of preventing carbon deposition. In the presence of calcium oxide, the poisoning effect of the catalyst due to sulfur contained in the feedstock hydrocarbons is not exhibited at all.

Therefore, in this catalyst, calcium oxide is contained in a large amount of 20 to 60 wt.% based on the total weight of the catalyst. This is to be distinguished from the use of small amounts of calcium oxide as in the usual catalysts which contain calcium oxide as merely an ingredient of the catalyst carrier incorporated therein.

Figure 2:
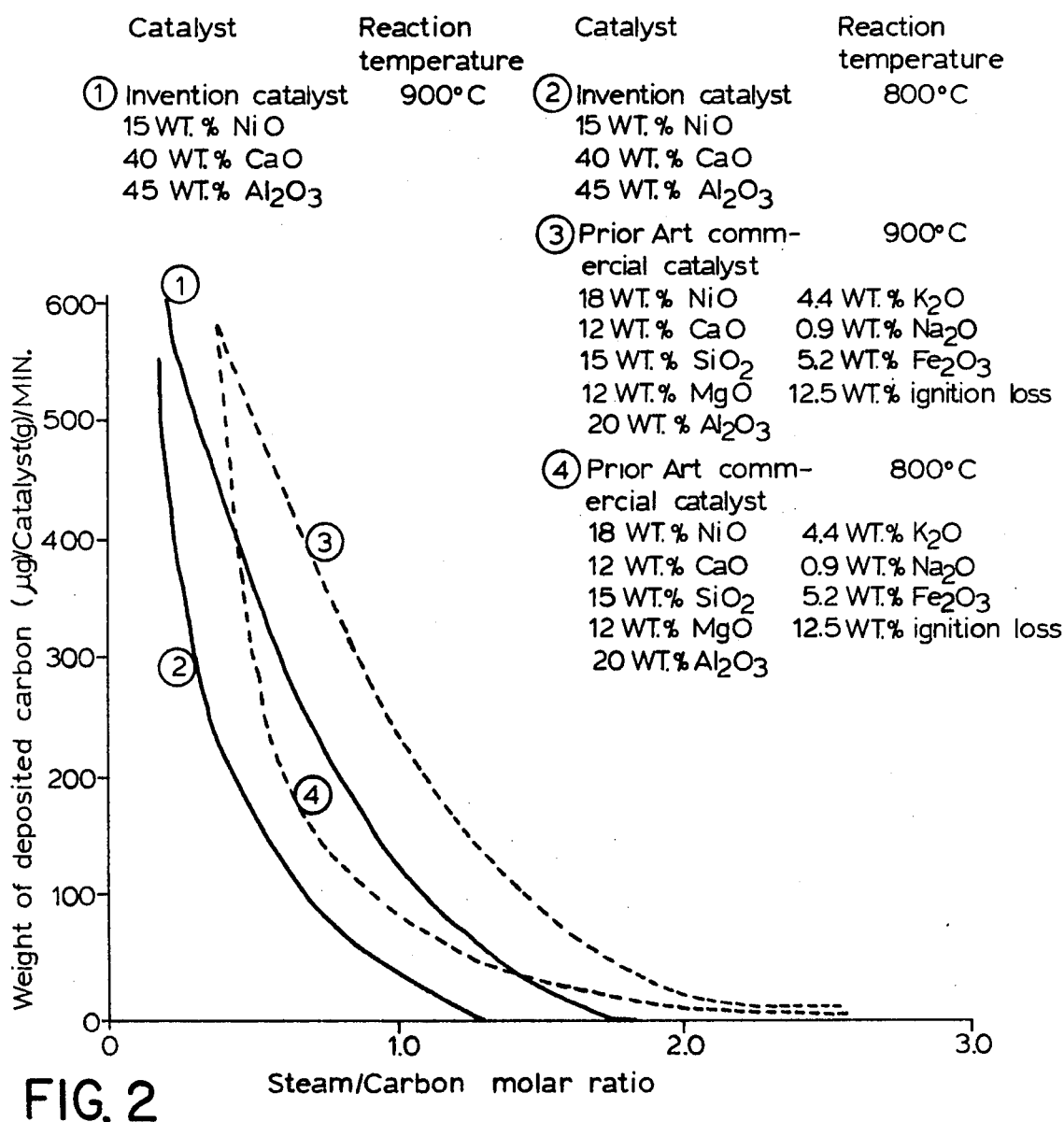
FIG. 2 is a graph showing the relation of weight of carbon deposited on the catalyst to the steam/carbon ratio in the reaction zone.

The relationship between the calcium oxide content and the amount of carbon deposit is shown in FIG. 2.

The catalysts used for the tests whose results are shown in FIG. 2 had nickel oxide contents of 15 wt.% and 18 wt.%. The reaction temperatures were 800° C and 900° C. The feedstock hydrocarbon was the same gas oil as described with reference to FIG. 1.

No carbon deposition is observed when calcium oxide content is 30 wt.% and the steam/carbon molar ratio is 3.0 or more. If the calcium oxide content is more than 50 wt.%, carbon deposition does not occur even if the steam/carbon molar ratio is 1.5 or more.

Figure 3:
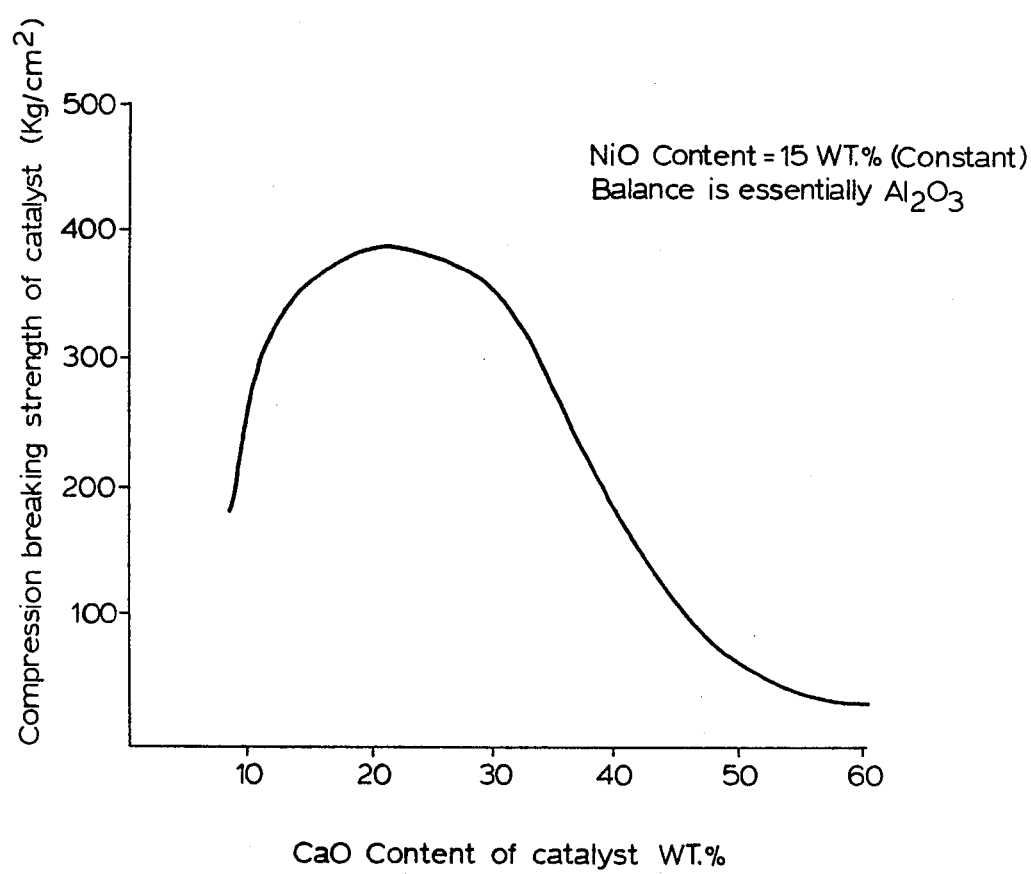
FIG. 3 is a graph showing the relation of compressive breaking strength of the catalyst to the CaO content thereof.

FIG. 3 shows the change in the compressive breaking strength of a sintered catalyst having a constant nickel oxide content of 15 wt.% and varying calcium oxide content. The catalyst having a calcium oxide content of 20 wt.% is the strongest.

A part of the calcium oxide is supplied by the alumina cement wherein the calcium oxide is present as calcium aluminate. The balance of the starting material used for supplying calcium oxide in the catalyst can be calcium oxide or any calcium compound, such as calcium carbonate, which is thermally decomposed into pure calcium oxide by the high temperature in the final sintering stage of the catalyst preparation process according to the invention.

In the absence of a large amount of calcium oxide, at the high sintering temperature used in preparing the catalyst and the high temperatures used in the steam reforming process, the nickel oxide in the catalyst would easily combine with aluminum oxide to form nickel aluminate, which has a low activity in the steam reforming reaction. The nickel aluminate would thus be formed in the catalyst texture during the use of the catalyst at a high temperature over a long period of time. Nickel aluminate increases in amount gradually during the reaction and thereby the activity of the catalyst would decrease seriously. However, as described above, the catalyst of the invention contains a large amount of calcium oxide, which has been firmly combined with aluminum oxide during the alumina cement-baking treatment (preparation of the alumina cement) and the sintering treatment of the catalyst preparation process. Accordingly, the combination of the nickel oxide and aluminum oxide to form nickel aluminate is inhibited and, consequently, the activity of the catalyst is not reduced. Thus, a calcium oxide content of the catalyst of at least 20 wt.% is critical.

Aluminum oxide is used for imparting the mechanical strength necessary for preparing stable shaped catalyst articles. Aluminum oxide is incorporated in the catalyst as alumina cement of a high purity. Alumina cement is used in an amount of more than 8 wt.% based on the total weight of the composition starting materials. The alumina cement can be prepared as described in U.S. Pat. No. 3,969,542, the entire contents of which are incorporated herein by reference.

It has been well known that it is effective generally to incorporate silicon dioxide in refractory compositions to obtain high strength. However if the catalyst of the invention contains more than 1 wt.% of silicon dioxide, the ability thereof to inhibit carbon deposition on the surface of the catalyst is reduced seriously.

Accordingly, as the alumina cement used as a starting material for preparing the catalyst, there is selected a high quality cement consisting essentially of only aluminum oxide and calcium oxide, and containing as small as possible an amount of impurities, particularly not more than 1% silicon dioxide.

The presence of silicon dioxide causes a reduction in the capacity of inhibiting carbon deposition and, further, it forms low activity components such as nickel silicate, nickel alumino silicate, nickel calcium silicate, etc. in the catalyst texture.

The allowable upper limit of silicon dioxide content in the catalyst is 1 wt.%, preferably 0.5 wt.%.

The reasons why the catalyst possesses excellent properties are discussed below.

The calcium oxide (active ingredient) content is high, but without reducing the mechanical strength of the molded catalyst articles.

In conventional catalysts, the active ingredients such as nickel, etc., remain as constituents of the precursors used as starting materials until the last step of the catalyst preparation process and unnecessary components of the precursors other than the active nickel oxide component, are expelled from the catalyst articles by the high temperature employed in the final sintering step of the catalyst preparation process or in the initial step of using the catalyst for steam reforming. Therefore, the texture around the particles of active ingredients becomes porous and the particles of the active ingredients are not fixed stably in the catalyst textures. On the other hand, in the catalyst of the present invention, fine particles of nickel oxide which are stable at the high temperature employed in using the catalyst, have been incorporated in the catalyst texture and, therefore, the porosity of the catalyst texture around the fine particles of nickel oxide is low and the nickel oxide particles are fixed firmly in the texture. In addition, in the latter catalyst, calcium oxide particles, having high capacity of inhibiting carbon deposition and high sulfur resistance, are contained in a large amount in tight contact with the nickel oxide particles.

If the expulsion of the unnecessary components from the precursor of the conventional catalyst is insufficient, a part of the unnecessary components remains on the surface of the catalyst and acts as a nucleus for carbon deposition. However, such a phenomenon does not occur in the present invention.

In the catalyst of the invention, the particle size of the nickel oxide is very small and, accordingly, the nickel oxide particles are distributed uniformly in the catalyst texture by blending them with the other starting materials of the catalyst; and In the catalyst of the invention, the amount of harmful impurities such as silicon dioxide is controlled and the contents of active ingredients are very high.

If weighing and mixing of the active ingredients is effected in a wet system, for example, by the coprecipitation method wherein an active ingredient-containing precursor is coprecipitated with other substances such as a carrier-forming substance, or by the immersion method wherein the carrier substance is immersed in a solution of precursor, which methods have been employed frequently in the preparation of conventional catalysts, a precise control of the mixing is difficult, the catalyst qualities fluctuate and the reproducibility of the catalyst properties is low. However, in the catalyst of the invention, weighing and mixing of the starting materials is effective precisely by employing the dry starting materials and quality control is ensured.

It is very important, in practical use, that a catalyst shall have a sufficient mechanical strength as well as activity. In this respect, the catalysts of the invention are sintered at a temperature higher than that employed during use of the catalyst, whereby to reinforce the bonds between the particles of the components by a hot solid phase reaction. In addition to that, they already have a high strength obtained by the hydration property of the alumina cement.

It is noteworthy that the nickel of the catalyst of the invention is not deactivated by sulfur impurities contained in the feedstock hydrocarbons. Although the reasons for this have not been elucidated yet, it is considered that the calcium oxide contained in a large amount in tight contact with fine particles of nickel oxide exerts a great influence leading to this advantageous result.

Owing to the properties of the catalyst as described above, heavy hydrocarbons having a high sulfur content, which could not be used as feedstocks for the steam reforming reaction in the presence of conventional catalysts due to the formation of a large amount of carbon deposit under various conditions, can be effectively used for the steam reforming reaction when the catalyst of the invention is employed. Thus, heavier hydrocarbons can be steam-reformed at a reaction temperature in the range of 700° to 1000° C under a pressure ranging from atmospheric pressure to an elevated pressure of, for example, 300 atmospheres, to form a gaseous mixture mainly comprising hydrogen, continuously, for a long useful operating life.

The preparation of the catalyst will be further described below:

Fine particles (particle diameter; less than 10 microns) of nickel oxide prepared carefully as described above, a starting material capable of being transformed to calcium oxide during the subsequent catalyst treatment steps and hydraulic alumina cement are weighed precisely under dry conditions, then mixed and kneaded together with water.

For preventing the particles of the starting materials from forming lumps due to heat generated during the kneading, the materials are kneaded rapidly by using a suitable kneading device such as a high speed masticator.

The lower limit of water prior to the kneading, is 3 wt.% based on the total weight of the mixture. The upper limit is not critical.

After kneading, the mixture of the starting materials is molded into a desired form such as granules, spheres, columns or cylinders, by a roll forming method, extrusion method, pressure molding method, casting method or the like conventional catalyst molding processes.

For controlling the formation of lumps or for increasing the hemogeneity of the kneaded mixture containing even a small quantity of water added during the kneading, an effective amount of a lumping retardant, dispersing agent or anti-caking agent can be used, if needed.

After the kneading, the mechanical strength of the moldings increases gradually due to the hydration of the alumina cement. The moldings are cured at ambient temperature under a highly humid ambient atmosphere having a relative humidity of higher than 60% for a period of longer than one day for preventing heterogeneous hydrating and to effect hardening of the moldings. The moldings are dried at a temperature below 350° C and then sintered at a temperature below 1200° C but above the temperature (700° to 1000° C) at which the catalyst will be used.

In the sintering treatment, the calcium compound in the moldings is dehydrated and thermally decomposed into calcium oxide, which causes a hot solid state reaction to occur without forming a fused liquid phase, under conditions in which the fine particles of nickel oxide are uniformly dispersed in calcium oxide and the alumina cement having an excellent volume stability at a high temperature, whereby to form a firm air-permeable porous body in which fine particles of nickel oxide, calcium oxide and aluminum oxide are distributed uniformly.

The catalyst thus obtained after the sintering treatment has a porous texture of an apparent porosity of 45 to 75% and a bulk density of 1.0 to 1.8. The catalyst has a sufficient strength against impacts or loads during transportation or due to charging or accumulation in the reaction zone so that it is suitable for practical use. The catalyst is not broken by immersion in boiling water for longer than one hour. The weight gain due to hydration caused by the immersion is 10 to 30% but the shape and volume thereof remains unchanged and no cracking occurs.

For a better understanding of the present invention, an example of the process for the preparation of the catalyst and the use thereof will be given.

EXAMPLE

Basic nickel carbonate was charged in a refractory vessel, which was then heated in an electric furnace, the temperature in which was 800° C, in air, for 3 hours to convert it into fine particles of nickel oxide. The particles were allowed to cool.

The fine particles of nickel oxide were mixed with alumina cement of a high purity of 97% comprising 79.0 wt.% of $Al_2O_3$, 18.7 wt.% of CaO, 0.1 wt.% of $SiO_2$, 0.3 wt.% of $Fe_2O_3$ and 0.4 wt.% of MgO and having an ignition loss of 1.5 wt.% and a particle size of less than 74 microns, and with precipitated calcium carbonate having a particle size of less than 15 microns, in the weight ratios as shown in Table 1.

Table 1

| Preparation No. | 1 | 2 | 3 | 4 | 5 |
|---|---|---|---|---|---|
| Nickel Oxide (wt.%) | 17.1 | 25.5 | 17.5 | 10.9 | 13.7 |
| Precipitated Calcium Carbonate (wt.%) | 30.6 | 27.1 | 19.0 | 57.3 | 68.0 |
| Alumina Cement (wt.%) | 52.3 | 47.4 | 63.5 | 31.8 | 18.3 |

One part by weight of powder methylcellulose was added, as a cohesiveness improving agent, per 100 parts by weight of each of the compositions shown in Table 1. Then, 26 parts by weight of water were added thereto, respectively, and the mixture was kneaded in a masticator for 3 minutes. Immediately thereafter, the mixture was molded into pellets of a diameter of 12.5 mm and a length of 12 mm in a water-cooled extruder.

The moldings were kept in a closed vessel at a temperature of 10° C under a relative humidity of higher than 80° for two days to effect curing, thereby obtaining complete hydration of the cement.

The moldings thus hardened were dried by heating them in a furnace at a temperature up to 350° C. Then the temperature was raised to 1100° C in the heating furnace and was kept at that temperature for 3 hours to sinter the moldings.

The physical properties of the sintered products are shown in Table 2.

Table 2

| Preparation No. | 1 | 2 | 3 | 4 | 5 |
|---|---|---|---|---|---|
| Composition | | | | | |
| NiO | 20.00 | 29.7 | 20.0 | 15.0 | 19.8 |
| $Al_2O_3$ | 47.5 | 41.6 | 55.1 | 33.5 | 20.1 |
| $SiO_2$ | 0.06 | 0.06 | 0.07 | 0.05 | 0.03 |
| $Fe_2O_3$ | 0.19 | 0.17 | 0.21 | 0.14 | 0.10 |
| CaO | 31.5 | 27.6 | 23.5 | 50.0 | 59.3 |
| MgO | 0.36 | 0.32 | 0.36 | 0.39 | 0.40 |
| $Na_2O+K_2O$ | 0.31 | 0.27 | 0.36 | 0.21 | 0.15 |
| Apparent Porosity (%) | 56.4 | 55.7 | 53.3 | 61.1 | 68.6 |
| Apparent Specific Gravity | 3.22 | 3.48 | 3.27 | 2.90 | 3.44 |
| Bulk Density | 1.33 | 1.53 | 1.53 | 1.13 | 1.08 |

A light oil comprising 85.92 wt.% of carbon, 13.64 wt.% of hydrogen and 0.41 wt.% (=4100 ppm.) of sulfur was steam-reformed, at a steam/carbon molar ratio of 2.99, in the presence of the sintered pellets as catalyst under atmospheric pressure. The results are shown in Table 3.

The "extinction temperature" appearing in Table 3 is intended to be a temperature where no desired hydrocarbon can be detected after an amount of the hydrocarbon decreases as the reaction temperature rises under the conditions of a constant steam-carbon ratio and a constant amount of starting materials fed. It is of practice that the extinction temperature can be determined in respect to a hydrocarbon by extrapolation method from a graph showing a relation between reaction temperature and product gas composition.

Table 3

| Preparation No. Reaction Conditions | 1 | | 2 | | 3 | | 4 | | 5 | |
|---|---|---|---|---|---|---|---|---|---|---|
| Temp. (° C) | 900 | 950 | 900 | 950 | 900 | 950 | 900 | 950 | 900 | 950 |
| Residence Time (sec. × 100) | 6.9 | 6.4 | 7.2 | 6.5 | 6.9 | 6.4 | 7.1 | 6.9 | 6.5 | 6.3 |
| Reaction Time (hr) | 85 | 5 | 5 | 5 | 5 | 5 | 5 | 5 | 5 | 5 |
| Composition of Product (Vol. %) | | | | | | | | | | |
| $H_2$ | 64.3 | 65.1 | 65.5 | 65.8 | 64.9 | 65.7 | 61.9 | 63.7 | 63.0 | 64.6 |
| CO | 15.8 | 16.2 | 17.3 | 17.4 | 16.7 | 16.9 | 15.9 | 16.0 | 15.8 | 16.1 |
| $CO_2$ | 13.0 | 13.3 | 11.6 | 11.6 | 12.6 | 12.1 | 12.6 | 12.5 | 13.0 | 13.4 |

Table 3-continued

| | | | | | | | | | | |
|---|---|---|---|---|---|---|---|---|---|---|
| CH$_4$ | 5.9 | 5.4 | 5.6 | 5.2 | 5.8 | 5.3 | 7.0 | 6.5 | 6.7 | 5.9 |
| C$_2$H$_4$, C$_2$H$_6$ | 1.0 | — | — | — | — | — | 2.6 | 1.3 | 1.5 | — |
| Gasification Rate | 99.5 | 100 | 100 | 100 | 100 | 100 | 99.0 | 99.0 | 99.5 | 100 |
| Extinction Temp. of Hydrocarbons in the Product | | | | | | | | | | |
| C$_2$ | | 910 | | 890 | | 900 | | 965 | | 910 |
| C$_3$ | | 850 | | 830 | | 840 | | 900 | | 855 |
| C$_4$ | | 815 | | 800 | | 810 | | 860 | | 825 |

After the steam reforming reaction, carbon deposition on the surface of the catalyst was not observed in each case.

The embodiments of the invention in which an exclusive property or privilege is claimed are defined as follows:

1. The method of preparing a sintered shaped catalyst object which comprises the steps of:
   forming a moldable mixture by mixing and kneading with water
   (a) fine particles of essentially pure nickel oxide having a maximum particle size of less than about 10 microns,
   (b) particles of calcium oxide or particles of a calcium compound or a mixture of calcium compounds which compounds can be converted to pure calcium oxide free of impurities by heating same at the below-mentioned sintering temperature, and
   (c) an alumina hydraulic cement consisting essentially of calcium aluminates, the amount of said cement (c) being at least 8 weight percent based on the sum of the weights of ingredients (a), (b) and (c), wherein the ingredients (a), (b) and (c) are present in amounts effective to provide a sintered shaped catalyst object having the composition set forth hereinbelow;
   molding the moldable mixture into a shaped object;
   hardening the shaped object, at a temperature of from 5° to 35° C, in an ambient atmosphere having a relative humidity of higher than 60%, for longer than one day to hydrate and harden the cement;
   drying the shaped object at a temperature below 350° C; and
   sintering the dried shaped object at a temperature in the range of from 550° to 1200° C, the thus sintered catalyst object consisting essentially of 10 to 30 weight percent of nickel oxide, 20 to 60 weight percent of calcium oxide and 10 to 70 weight percent of aluminum oxide and containing less than 1 weight percent of silicon dioxide.

2. The method according to claim 1 wherein component (a) is obtained by heating, at from 400° to 800° C, in the presence of an oxygen-containing gas, a nickel compound or mixture of nickel compounds capable of being converted to nickel oxide when heated under those conditions.

3. The method according to claim 2 in which component (a) has a particle size of less than 1 micron.

4. The method according to claim 2 wherein said nickel compound is selected from the group consisting of nickel hydroxide, nickel nitrate, nickel carbonate, nickel sulfide, nickel formate, nickel acetate and nickel oxalate.

5. The method according to claim 1 in which the amount of water is at least 3 weight percent based on the total weight of the mixture.

6. The method according to claim 1 in which the shaped object is placed in a vessel, the vessel is closed and the shaped object is hardened in the closed vessel.

7. The sintered catalyst prepared by the method of claim 1.

8. The sintered catalyst as claimed in claim 7 which contains less than 0.5 weight percent of silicon dioxide.

9. The sintered catalyst as claimed in claim 7 having an apparent porosity of 45 to 75% and a bulk density of 1.0 to 1.8.

* * * * *